United States Patent [19]

Radebold

[11] 4,438,760

[45] Mar. 27, 1984

[54] CONCENTRATING REFLECTOR FOR SOLAR RADIATION OF LOW AERODYNAMIC FRICTION FORCE AND HIGH AERODYNAMIC BUOYANCY FORCE

[76] Inventor: Reinhart Radebold, Quastenhornweg 14a, 1000 Berlin 22, Fed. Rep. of Germany

[21] Appl. No.: 315,062

[22] Filed: Oct. 26, 1981

[30] Foreign Application Priority Data

Oct. 26, 1980 [DE] Fed. Rep. of Germany ......... 730068

[51] Int. Cl.³ ............................. F24J 3/02; B64C 3/06
[52] U.S. Cl. .................................. 126/438; 244/45 R; 350/293; 350/294; 126/439; 126/451; 126/417
[58] Field of Search ............... 126/438, 439, 417, 451; 350/294, 296, 293; 244/45 R, 53 R, 60

[56] References Cited

U.S. PATENT DOCUMENTS

| 2,504,137 | 4/1950 | Lewis | 244/53 R X |
| 3,153,878 | 10/1964 | Smith, Jr. | 126/417 X |
| 3,942,747 | 3/1976 | Wolkovitch | 244/45 R X |
| 4,002,158 | 1/1977 | Radebold | 126/438 |
| 4,146,199 | 3/1979 | Wenzel | 244/45 R |

Primary Examiner—Larry Jones
Attorney, Agent, or Firm—Ralf H. Siegemund

[57] ABSTRACT

Solar energy is focused by a paraboloidally curved, specularly reflective foil inside the wing of an aircraft having a transparent upper surface in whose rudder structure is disposed the radiation receiver. This particular reflector offers very low resistance to ambient wind forces.

8 Claims, 6 Drawing Figures

CONCENTRATING REFLECTOR FOR SOLAR RADIATION OF LOW AERODYNAMIC FRICTION FORCE AND HIGH AERODYNAMIC BUOYANCY FORCE

BACKGROUND OF THE INVENTION

The present invention relates to a reflector for use in solar radiation collecting systems.

In general, solar radiation can be used, even with good exergetic efficiency, in two particular ways:
1. Solar energy can be converted immediately into electrienergy by means of photovoltaic cells or into mechanical or refrigeration energy, e.g., by means of thermodynamic engines;
2. Solar radiation can be stored over a short or a longer period of time either in form of heat at a temperature above that of ambience, by using entropy-changing matter, or through a chemical reaction in the form of chemical energy, such as by photosynthesis of high-energy compounds in a photochemical reactor.

The conditions for making use of either one of the above-mentioned techniques will depend, first, upon the properties of the technical systems to absorb highly concentrated radiation; second, upon the availability of reflectors with a high concentration; and, third, upon the reduction of interference by adverse weather conditions both on the operation of the radiation-absorbing system proper and the concentration provided by the reflector.

Concentration of solar energy irradiated from the sun by means of concentrating reflectors, having a concentration coefficient or rate C ($1 \leq C < 1000$ is already proven) has the consequence that the absorbing system must, in principle, not differ in its dimensions from that of the focus. With an increasing concentration rate C, the power density within the absorbing system will increase while the quantity of material used decreases. In addition, the heat losses of the absorbing systems are, due to back-radiation and convection, drastically reduced, when compared with absorbing systems using concentrated radiation, because of their much larger exposed surfaces; as a result, the operation temperatures obtainable with concentration of radiation are much higher.

The use of concentrated radiation, however, is feasible only if the absorbing system and its reflector are integrated into a solar-energy-converter concentrator unit and track the sun. A unit of this kind has its, necessarily large and sensitive, surface oriented normal to the radiation and is usually exposed to great aerodynamic forces. Any relevant airflow will exert rather large forces upon the unit itself, mainly, on its reflector, the tracking device, and the anchoring. Dust, larger particles, and rain will destroy the reflecting surface. At more northern latitudes, frequent cloud covers reduce the average operation periods and, thereby, the economy of the system as a whole.

The design and construction of concentrating reflectors suitable for absorbing systems, either for conversion or storage of radiation and to be integrated in such a system, will ultimately determine the feasibility of large-scale,, technical implementation of solar energy systems in parallel with and independently from further developments of the advanced systems themselves. A number of proposals have been made so far for the development of concentrating reflectors at low costs and having an extended life span. In addition, it has been considered to lift the reflectors and absorber units from the ground by filling a carrier with a gas of lower density than ambient air. This way, one can attempt to exclude interference of the operation or radiation absorption by weather and climate conditions on the ground (see, for example, U.S. Pat. No. 4,002,158).

The problem at hand should be discussed in some detail. A "classical" parabolic dish reflector is, for example, made from sheats and covered on the inside with a glass mirror segment. The relative aerodynamic friction force is presumed normalized at $\sigma.F.p=1$. $\sigma$ is the aerodynamic friction factor, F is the surface normal to wind velocity vector, p is the dynamic pressure head. Assuming that this kind of reflector is unprotected, it must withstand great aerodynamic forces which is reflected in a very robust design. Such a reflector could be installed within a transparent radom in order to protect it from wind forces and to facilitate construction of both reflector and tracking device (an example is the BOEING System). In spite of the fact that the radom has a much larger surface projected normal to the wind vector than the unprotected mirror, the relative aerodynamic friction force is $\sigma.F.p=0.67$ due to a more favorable friction factor $\sigma$.

In the case of a bubble- or radom-protected reflector, the forces exerted upon the reflector proper are smaller. For this reason, a light-weight construction principle in regard to the reflector can be applied. The radome provides a thin, transparent, protecting envelope; and the reflector could be made from a thin and properly formed foil which has reflecting properties due, for instance, by sputtering it with aluminum. The foil mentioned above can be brought into a well-defined paraboloid shape generated under tensile load and by a pressure difference between its inside and outside; for this, it is necessary to anchor the foil on its border to a rigid, supporting cylinder, to close the cylinder at its other end, and to slighty diminish the pressure of the enclosed air. The cylinder can also be replaced by a cylindrical, frame-like structure (an example: the KLEINWÄCHTERBOMIN system).

As mentioned before, the economy of a concentrating solar energy converter unit does not only depend upon the amount of material used to produce the reflector, but also on the long duration of useful operation. It is, therefore, appropriate to place both the reflector and the absorbing system above the main cloud layers. This is possible only if the unit as a whole is buoyant (see U.S. Pat. Nos. 4,002,158 and 4,127,453). Due to the fact that the pressure differences necessary to shape the foils are quite low, it is, indeed, possible to generate large aerostatic buoyancy forces by, for instance, filling the interior of appropriate compartments with hydrogen; large, hydrogen-filled cushions can be added in order to reduce the supporting, rigid structure and to increase overall the interior gas volume. By this means, the surface opposed to the wind will, however, increase; the relative friction force $\sigma.F.p=1.96$.

Another alternative for obtaining aerostatic buoyancy employs the radom in conjunction with a light-weight structure. A properly shaped, reflecting foil devides a spherical radom in two compartments with different gas pressures in order to generate the curvature of the foil. The relative friction force is decreased and $\sigma.F.p=0.49$. The advantage of this alternative can, in addition, be seen in the possibility of avoiding hydrogen filling and replacing the hydrogen with hot air.

DESCRIPTION OF THE INVENTION

It is an object of the present invention to provide a reflector for purposes of concentrating solar radiation, which will avoid the problems posed by the various reflectors and their construction, and which will reduce their aerodynamic resistance.

It is a feature of the present invention to provide a solar radiation-concentrating reflector within an aerodynamic, wing-like airfoil, having its wings bent laterally upward (i.e., at a roll-stabilizing, large, positive dihedral angle) and being, further, provided with an elliptically bent wing nose (for stabilizing yaw motions) which is achieved by bisecting a parabloid and "using one-half" thereof.

The most important difference with regard to known structures is the fact that the lifting force is not an aerostatic buoyancy force but achieves aerodynamic lifting due to the particular profile of the reflector and its support; through this, the drag force is reduced by more than one order of magnitude. The relative friction factor $\sigma$ of the aerodynamic profile used is approximately $\sigma = 0.04$; resulting in $\sigma.F.p = 0.017$. Any hydrogen or hot-air filling is not necessary.

In accordance with the preferred embodiment of the invention, it is suggested to provide a specularly reflective foil in the contour of and inside a paraboloidal sector, having accordingly a leading and a trailing edge, the latter approximately along the line along which the section is taken. The substructure underneath that foil establishes the power, concave part of the contour for the wing, and a transparent, convex foil completes the wings upper surface so that the structure as a whole is of an aerodynamic liftproducing configuration. This wing has a plane of symmetry, and a rudder and a rudder support structure are disposed that plane of symmetry; moreover, the focal area of the parabolic surface is located in the support structure so that a radiation receiver or absorber can be mounted thereon.

The section should cover approximately 180°, measured in relation to the center axis of the paraboloid. The wing body itself should be under lower pressure. The rudder support structure may also carry an engine in order to provide the airfoil with propulsion. Alternatively, a generator may be provided at that location.

The invention is thus based upon a device which can be described as a paraboloid-like dish reflector for solar radiation with a high concentration rate and being characterized by a high aerodynamic buoyancy or lift force, high aerodynamic stability, and low aerodynamic friction or drag force which concentrates solar radiation in a focal zone in which the solar energy is converted into another form of energy. The reflector may be anchored to the ground or floating on water or cruising at high altitudes as a flying craft. The craft will include a system, carried along and integrated for the storage of solar radiation in form of chemical energy by the photosynthesis of high-energy liquid compounds within a photoreactor and/or for the conversion of solar radiation into driving energy by means of a thermodynamic device and/or other types of energy conversion functions.

The preferred embodiment of the invention is a free-flying aircraft with relatively large wing spans in order to capture a large amount of radiation. The free-flying application, however, is not the only one for a concentrating reflector designed in accordance with the principles shown in several of the figures. An aircraft possibly with a smaller wing span, fixed to the ground or floating in water, and being movable in all three axes, has clearly an economic value. The very low aerodynamic drag, the high aerodynamic stability, and, in cases of increased air motion at the ground, the aerodynamic lift (i.e., the high lift-to-drag ratio) presents an advantage when compared with known reflectors. Sun tracking is, of course, necessary; this can, however, be provided or at least supported by action of the rudder and the elevator flaps. Because any propulsion engine for flying the aircraft is not used if the aircraft is actually anchored to the ground or floating in water (except for calm sun-tracking), a propeller may drive, for instance, a generator for the generation of electricity which replaces the driving engine.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which

Figure 6:
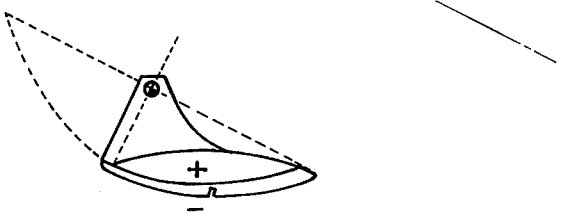
FIG. 6 is a view similar to FIG. 4 but serves only toward the understanding of the geometry involved.

Proceeding now to the detailed description of the drawings, the geometry of the aircraft can be understood best with reference to FIG. 6. Consider a tilted paraboloid cut approximately in half, the cutting plane will extend perpendicularly to the plane of the drawing of FIG. 6. The remaining paraboloidal section surface constitutes the surface in which the specularly reflecting surface is to extend. The focal point 50 is situated in the rudder of the aircraft. The wing tips appear to be bent upward on account of that portion of the paraboloid close to the above-defined line of cutting. This (hypothetical) plane of cutting, inherently, establishes a leading edge (14, infra) and a trailing edge as well as a plane of symmetry which is the plane of the drawing of FIG. 6.

Turning now to structural details, the aircraft shown in the figures includes a wing 10, established by a transparent foil 11, and a lower skin 12. Skin 12 can be made of a synthetic material or aluminum. In the preferred form, skin 12 covers the underside of a wing body and support structure comprised of rigid foam 13. The structure has ribs 19. The support structure 13, as covered by foil 12, defines the underside profile of the wing as well as the leading edge 14 thereof and constitutes a shell structure for the wing. The leading edge 14 can be interpreted as (or being near) the undisturbed rim of the paraboloid (FIG. 6) from which the aircraft's upper transparent surface "extends".

Figure 1:
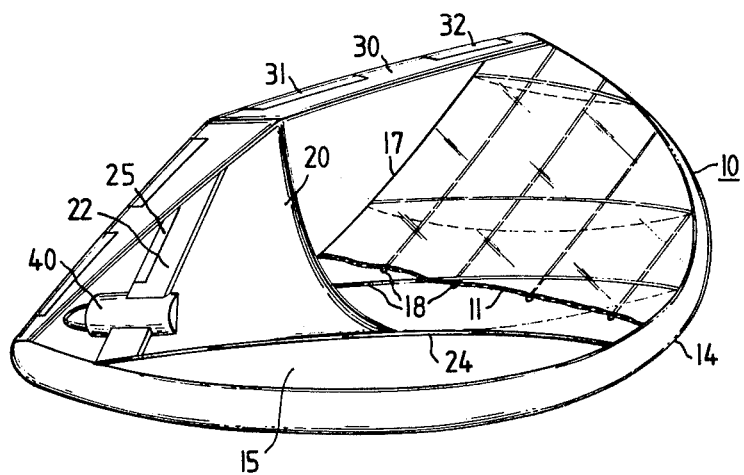
FIG. 1 is an isometric view, a part of the transparent foil being cut away, of an aircraft with a reflector surface constructed in accordance with the preferred embodiment of the present invention for practicing the best mode thereof.
Figure 2:
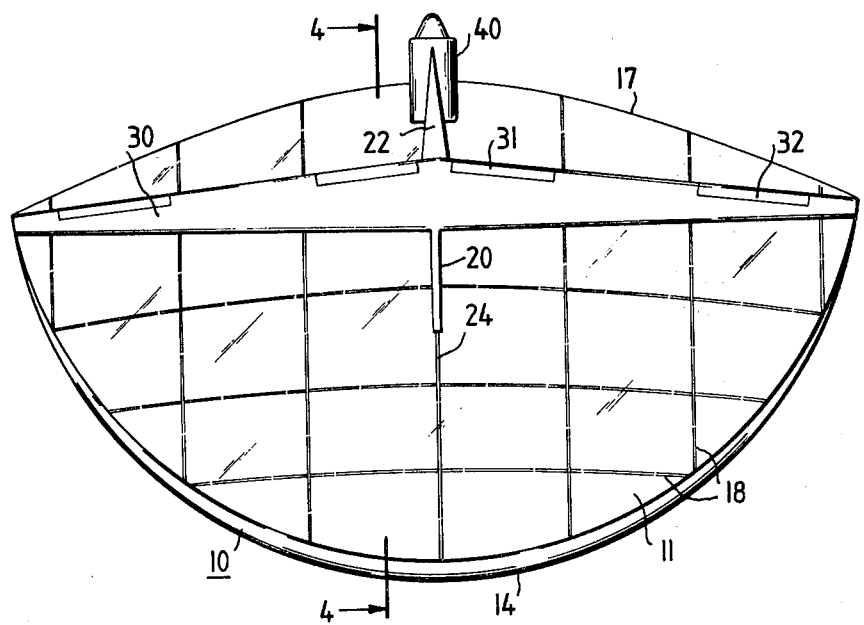
FIG. 2 is a top elevation of approximately one half of the aircraft shown in FIG. 1, constituting, in fact, a plan view of the reflection surface.
Figure 3:
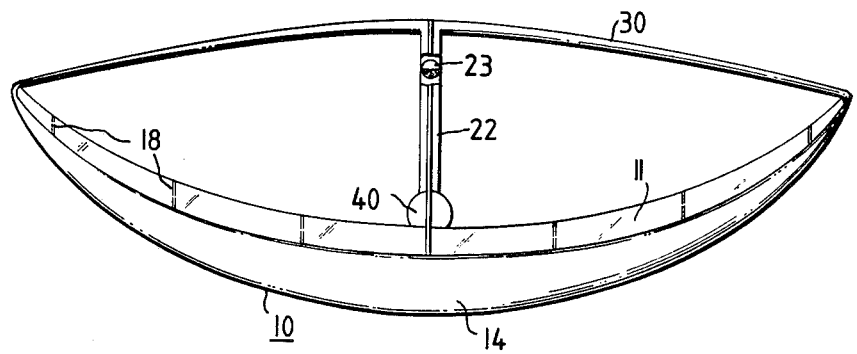
FIG. 3 is a front view of the aircraft shown in FIGS. 1 and 2.
Figure 4:
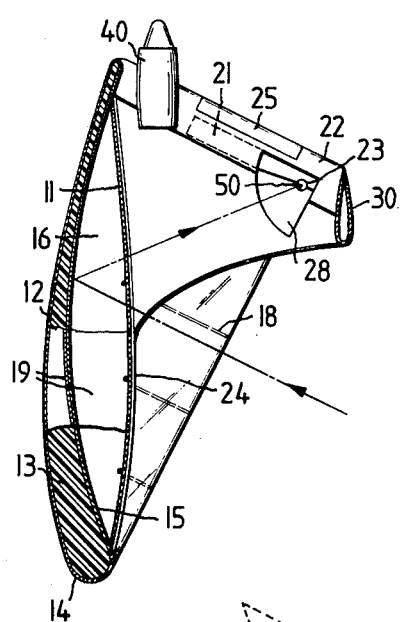
FIG. 4 is a section view of the aircraft taken along lines 4—4 as indicated in FIG. 2.

The upper side of the support structure and foam body 13 is covered by a reflecting foil 15 which constitutes the reflector proper of the device. The reflecting foil 15 as well as the transparent foil 11 define a cushioning chamber 16 which is pressurized in order to establish the convex curvature of foil 11 to, thereby, generate the aerodynamically effective upper surface of the wing. The wing has, in addition, a trailing edge 17 which, in the view of FIG. 2, appears to be curved slightly convex. Strictly speaking, in accordance with the hypothetical model (FIG. 6), from which the aircraft is "generated," these trailing edges should be a straight line. However, for aerodynamic reasons, a slight curve is preferred. The lines 18 denote tensioning and reinforcement elements, such as cables, for the support of foil 11 in order to permit the foil to be made as thin as possible. Also, some of the external forces, such as wind load, will be reacted by these elements 18 into the rigid foam body 13. The dotted lines in FIG. 1 constitute the geometric projections of the grid onto the reflection surface 15, in longitudinal direction, and serve only an illustrative purpose.

It should be noted that foam body 13 of the wing can be entirely replaced by regular spar and other conventional elements (such as 19) for the construction of airfoils. Thus, the interior of the support structure 13 may, at least in parts, be hollow; and the hollow space may serve as compartments for the storage of fuel for an engine 40. Also, the hollow space can be used for storing the reaction compounds and/or reaction products generated by absorber unit 21. It can be realized that, even in case of foam construction, a portion of the interior of the wing may for such purposes be hollow. In addition, and this is true particularly in the case of a larger unit, a portion in the interior of the wing can also be used as a compartment occupied by a pilot.

The aircraft further includes a rudder element 20 whose leading edge is relatively thin in order to reduce air resistance as well as to permit focusing of the solar radiation onto the absorbing system 21, the focal area being denoted by numeral 50. The radiation-absorbing system 21 is inserted in the thick rear part of the rudder, denoted by 22, in form of a module. The radiation passes through a spherical window 23. Should the focussed radiation escape from the true focal area 50, located within the window 23, the structure parts of the aircraft will not be exposed to the concentrated radiation due to the opening 28 which extends into the thin part of the rudder. In the case of a highly tuned geometry for foil 15, all of the incoming rays, as indicated by the arrow in FIG. 9, will penetrate window 23. The rudder is supported by an arch 24, disposed above the transparent foil 11, and the front of that arch is secured to the supporting body 13 while the rear part merges into the front edge of the rudder. The rudder flaps are denoted by numeral 25.

The rudder 20 is connected to the two tips of the wing 10 by means of the elevators 30, each having a slightly rapezoidal form and holding flaps for respectively elevational control, 31, and for pitch and roll control, 32. The elevator structure 30 extends, in particular, from the top of rudder support 20 to the tips of the wings, which appear upwardly bent on account of the geometry as outlined earlier.

The drive mechanism and propulsion engine 40 of the aircraft may be a turbojet engine or a stirling engine or another heat engine with propeller and is fixed to the rear end of the flying aircraft, particularly on the base of the rudder. The propulsion engine can be designed to make use of the waste heat of the absorbing system 21. Alternatively, the engine may work independently from the absorbing system. In the case of a nonflying, anchored aircraft, the propulsion mechanism may be replaced by an electric generator.

Figure 5:
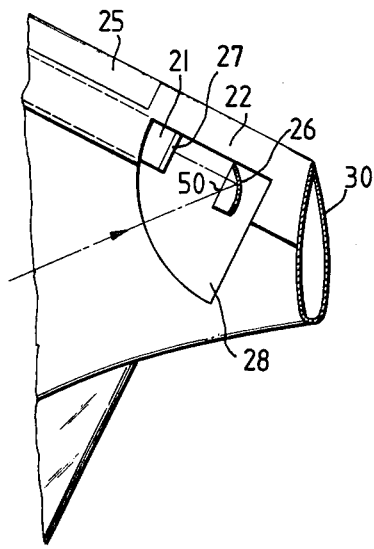
FIG. 5 illustrates an alternative detail.

The inventive aircraft has the following additional features. The surface of the thin part of rudder 20 can be used as a heat-exchanging surface in order to transfer the waste heat of the absorbing system 21 to the ambient air. An alternative feature regarding the optical path is shown in FIG. 5. The modification concerns, in particular, the design of the window of the absorbing system 21. A secondary mirror 26 is inserted in the elevator structure 30 which reflects the concentrated light into the absorbing system parallel to the axis of the latter. In this case, the spherical window 23 is replaced by a plane window 27 outside the focal area or point 50.

Finally, it should be pointed out that in the case of a large aircraft, the supporting arch (or bar) 24 must be supported by a fin or rib 19, for static reasons, placed within the space between foil 11 and skin 12 in the center axis of the wing; in this specific case, the reflecting foil 15 as well as the transparent foil 11 are separated into two parts.

The invention is not limited to the embodiments described above; but all changes and modifications thereof, not constituting departures from the spirit and scope of the invention, are intended to be included.

I claim:
1. A reflector for concentrating solar radiation, comprising:
a foil having a surface of specular reflection and having a contour and configuration of a paraboloidal sector, having accordingly a leading edge and a trailing edge and a plane of symmetry;
means disposed above and underneath the foil and providing a wing-like structure of which the upper surface is transparent, there being a lower surface accordingly completing, with the upper surface, an aerodynamic, liftproducing profile;
means including a rudder and rudder support structure and extending upward from said profile, in said plane of symmetry, and contoured so that the rudder support structure includes a focal area for said paraboloid, the rudder support structure provided for receiving means for receiving radiation concentrated by the reflecting foil in said focal area.

2. A reflector as in claim 1, said section covering approximately 180°.

3. A reflector as in claim 1, the specularly reflecting surface being established by a foil, the wing-like structure being at a low pressure.

4. A reflector as in claim 1, including an elevation structure extending from said rudder support to the tips of the wing.

5. A reflector as in claim 1, and including a propulsion engine.

6. A reflector as in any one of claims 1 to 5, and including a secondary reflector to focuse, in addition, the radiation concentrated by the reflecting foil, into the receiving means.

7. A reflector as in claim 1, the wing including, at least in parts, a filling of a synthetic rigid foam.

8. A reflector as in claim 1, the upper transparent surface of which comprising reinforcement and tensioning elements.

* * * * *